United States Patent
Aratani et al.

(10) Patent No.: US 8,731,243 B2
(45) Date of Patent: May 20, 2014

(54) POSITION AND ORIENTATION MEASUREMENT METHOD AND POSITION AND ORIENTATION MEASUREMENT APPARATUS

(71) Applicant: Canon Kabushiki Kaisha, Tokyo (JP)

(72) Inventors: Shinichi Aratani, Tokyo (JP); Kiyohide Satoh, Kawasaki (JP); Daisuke Kotake, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/722,144

(22) Filed: Dec. 20, 2012

(65) Prior Publication Data

US 2013/0108112 A1    May 2, 2013

Related U.S. Application Data

(63) Continuation of application No. 11/944,998, filed on Nov. 26, 2007, now Pat. No. 8,355,531.

(30) Foreign Application Priority Data

Nov. 28, 2006  (JP) ................................ 2006-320872

(51) Int. Cl.
*G06K 9/00* (2006.01)
*G09G 5/00* (2006.01)
*G01C 17/00* (2006.01)

(52) U.S. Cl.
USPC ............................ 382/103; 345/633; 702/150

(58) Field of Classification Search
USPC ......... 382/103, 107, 216, 286, 291, 296, 297; 345/153, 633, 158, 659; 702/1, 127, 702/150, 153, 1.27, 27; 348/169–172
See application file for complete search history.

(56) References Cited

U.S. PATENT DOCUMENTS 6,453,223 B1 * 9/2002  Kelly et al. ..................... 701/28
7,038,699 B2 * 5/2006  Sato et al. ..................... 345/633

OTHER PUBLICATIONS

Kiyohide Satoh and Hideyuki Tamura, "A Review of Registration Techniques in Mixed Reality", Meeting on Image Recognition and Understanding (MIRU2002) Transactions I, IPSJ Symposium Series, vol. 2002, No. 11, pp. I.61-I.68, Jul. 2002.

Hirofumi Fujii, Masayuki Kanbara, Hidehiko Iwasa, Haruo Takemura, and Naokazu Yokoya, "A Registration Method Using Stereo Cameras with an Inertial Sensor for Augmented Reality", Technical report of IEICE PRMU99-192 (Technical Report of IEICE, vol. 99, No. 574, pp. 1-8), 2003.

Tomokazu Sato, Masayuki Kanbara, Naokazu Yokoya, and Haruo Takemura, "Camera Movement Parameter Estimation from a Long Image Sequence by Tracking Markers and Natural Feature Points", Transactions of IEICE, D-II, vol. J86-D-II, No. 10, pp. 1431-1440, 2003.

* cited by examiner

*Primary Examiner* — Abolfazl Tabatabai
(74) *Attorney, Agent, or Firm* — Cowan, Liebowitz & Latman, P.C.

(57) ABSTRACT

Indices allocated or set on an object are detected from sensed images of frames, which are time-serially sensed by an image sensing device. In association with each index detected from the sensed image of the frame of interest, a detection condition from frames before the frame of interest is acquired. According to the acquired detection condition of the index, the reliability of this index is calculated. The position and orientation of the object or the image sensing device are calculated using at least information associated with the image coordinates of the detected indices and the reliabilities of the indices.

8 Claims, 5 Drawing Sheets

POSITION AND ORIENTATION MEASUREMENT METHOD AND POSITION AND ORIENTATION MEASUREMENT APPARATUS

CROSS-REFERENCE TO RELATED APPLICATION

This application is a continuation of application Ser. No. 11/944,998, filed Nov. 26, 2007, the entire disclosure of which is hereby incorporated by reference.

BACKGROUND OF THE INVENTION

1. Field of the Invention

The present invention relates to a technique for improving the precision and stability of viewpoint position and orientation measurement.

2. Description of the Related Art

In recent years, studies about mixed reality (MR) that aims at seamless merging of physical and virtual spaces have been extensively made. An MR image is generated by superimposing and rendering virtual space images generated according to the position and orientation of an image sensing device such as a video camera or the like on a physical space image sensed by the image sensing device. An image display apparatus used in an MR system is implemented by, e.g., a video-see-through system. Note that the virtual space images include a virtual object rendered by computer graphics, text information, and the like.

In order to implement the MR, registration accuracy between the physical space and virtual space is important, and many approaches have been tested conventionally. A problem about registration in the MR is reduced to a problem of calculating the relative position and orientation between a target object on which virtual information is to be superimposed, and the image sensing device (to be referred to as the position and orientation of the image sensing device hereinafter).

As a method of solving this problem, the following attempt has been made (see Sato and Tamura: "A Review of Registration Techniques in Mixed Reality", Meeting on Image Recognition and Understanding (MIRU2002) Transactions I, IPSJ Symposium Series, vol. 2002, no. 11, pp. 1.61-1.68, July 2002). That is, a plurality of indices whose allocations on a target coordinate system are known are placed or set in an environment or on a target object. Then, the position and orientation of the image sensing device with respect to the target coordinate system are calculated using the three-dimensional (3D) coordinates on the target coordinate system of the indices as known information, and the coordinates of projected images of the indices in an image sensed by the image sensing device.

Also, an attempt that attaches an inertial sensor on an image sensing device and uses the sensor measurement value to achieve more stable registration than a case using only image information has been made. For example, a method that uses the position and orientation of the image sensing device estimated based on the sensor measurement value in index detection processing has been proposed. Also, a method that uses the estimation results as initial values for the position and orientation calculation based on an image has been proposed. Furthermore, a method that uses the estimation results as a rough position and orientation even in a situation in which indices are not observed has been proposed (see Japanese Patent Laid-Open No. 2005-33319, and Hirofumi Fujii, Masayuki Kanbara, Hidehiko Iwasa, Haruo Takemura, and Naokazu Yokoya, "A Registration Method Using Stereo Cameras with an Inertial Sensor for Augmented Reality", Technical report of IEICE PRMU99-192 (Technical Report of IEICE, vol. 99, no. 574, pp. 1-8)).

The conventional registration technique using image information is premised on that all index detection results are correct. Furthermore, all index detection results are calculated using uniform weights. For this reason, correct position and orientation measurement often fails due to a large influence of indices as detection errors or those with low detection precision. Hence, the following technique has been proposed in recent years. That is, a statistical estimation method such as M estimation is adopted to calculate errors (re-projection errors) between the observation coordinates of the detected indices (feature points) on an image and the image coordinates (re-projected coordinates) of indices estimated from the position and orientation of the image sensing device and the positions of indices. Then, the reliabilities of the detected indices are calculated based on the errors to eliminate erroneously detected indices or to reduce their influences (see Sato, Kanbara, Yokoya, and Takemura, "Camera Movement Parameter Estimation from a Long Image Sequence by Tracking Markers and Natural Feature Points", Transactions of IEICE, D-II, vol. J86-D-II, no. 10, pp. 1431-1440, 2003).

However, the technique which calculates the reliabilities based on the re-projection errors, and weights the indices to eliminate detection errors has a scheme for determining erroneously detected indices by statistically calculating exceptional values. For this reason, the technique assumes that detection errors of indices detected on an image apply to an error model such as a Gaussian distribution or the like, and is valid only when there are many indices that are likely to be detected correctly under that assumption. Therefore, when there are a small number of indices, the above technique is readily influenced by detection errors, and is not satisfactory as a detection error elimination technique. In a situation in which the index detection result changes little by little depending on an illumination condition and the like (an index which was detected in a given frame is not detected in the next frame), a mismatch of the position and orientation measurement results between frames occurs, thus disturbing stable position and orientation measurement.

SUMMARY OF THE INVENTION

The present invention has been made in consideration of the aforementioned problems, and has as its object to provide a technique that attains position and orientation measurement with high precision and stability by reducing the influences of erroneously detected indices or indices with low detection precision.

According to the present invention, the foregoing object is attained by providing a position and orientation measurement method, comprising:

an input step of inputting sensed images of respective frames time-serially sensed by an image sensing device;

a detection step of detecting indices allocated or set on an object from each of the sensed images;

an acquisition step of acquiring, in association with each of the indices detected in the sensed image of a frame of interest, a detection condition from frames before the frame of interest;

a reliability calculation step of calculating a reliability of the index according to the detection condition of that index acquired in the acquisition step; and a position and orientation calculation step of calculating a position and orientation of the object or the image sensing device using at least information associated with image coordinates of the respective indices detected in the detection step and the reliabilities of the indices calculated in the reliability calculation step.

According to another aspect of the present invention, the foregoing object is attained by providing a position and orientation measurement apparatus, comprising:

an input unit adapted to input sensed images of respective frames time-serially sensed by an image sensing device;

a detection unit adapted to detect indices allocated or set on an object from each of the sensed images;

an acquisition unit adapted to acquire, in association with each of the indices detected in the sensed image of a frame of interest, a detection condition from frames before the frame of interest;

a reliability calculation unit adapted to calculate a reliability of the index according to the detection condition of that index acquired by the acquisition unit; and a position and orientation calculation unit adapted to calculate a position and orientation of the object or the image sensing device using at least information associated with image coordinates of the respective indices detected by the detection unit and the reliabilities of the indices calculated by the reliability calculation unit.

Further features of the present invention will become apparent from the following description of exemplary embodiments with reference to the attached drawings.

DESCRIPTION OF THE EMBODIMENTS

Preferred embodiments of the present invention will be described in detail hereinafter with reference to the accompanying drawings.

First Embodiment

In this embodiment, the reliabilities of respective indices are changed depending on the index detection conditions of a plurality of frames and then weighting is made, thus eliminating erroneously detected indices or indices with low precision or reducing their influences, and improving registration precision. The position and orientation measurement method of an image sensing device based on weighting according to the index detection conditions according to this embodiment will be described below.

Figure 1:
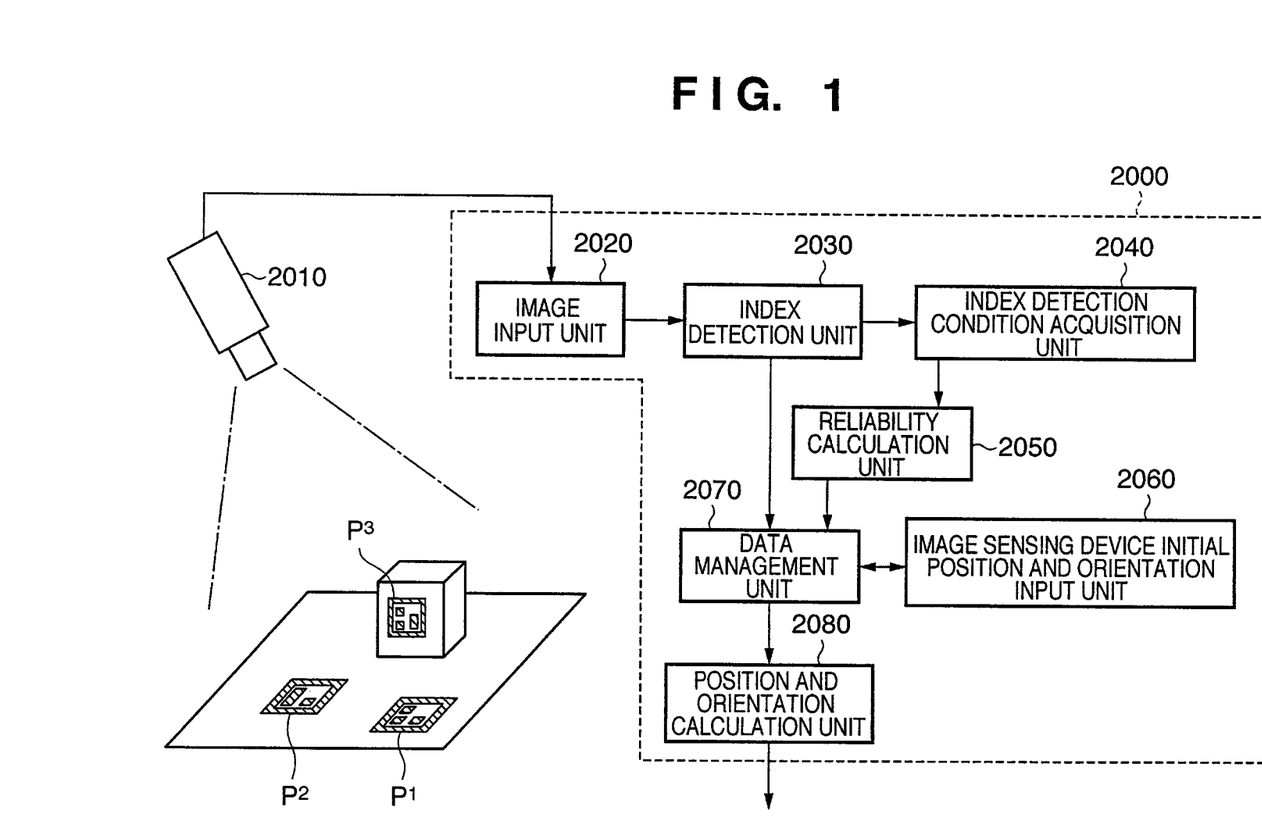
FIG. 1 is a block diagram showing the functional arrangement of a position and orientation measurement apparatus 2000 which measures the position and orientation of an image sensing device according to the first embodiment of the present invention.

FIG. 1 is a block diagram showing the functional arrangement of a position and orientation measurement apparatus 2000 which measures the position and orientation of an image sensing device according to this embodiment.

The position and orientation measurement apparatus 2000 comprises an image input unit 2020, index detection unit 2030, index detection condition acquisition unit 2040, reliability calculation unit 2050, image sensing device initial position and orientation input unit 2060, data management unit 2070, and position and orientation calculation unit 2080. To the image input unit 2020, an image sensing device 2010 which senses a moving image of a three-dimensional (3D) physical space is connected.

In this embodiment, assume that the image input unit 2020, index detection unit 2030, index detection condition acquisition unit 2040, reliability calculation unit 2050, image sensing device initial position and orientation input unit 2060, data management unit 2070, and position and orientation calculation unit 2080 are implemented by hardware. Therefore, some of these units comprise a controller such as a CPU or the like, a memory, and the like.

A plurality of indices are allocated on a background in the 3D physical space or on a target object allocated on that space. Let Pk (k=1, . . . Ko) be an index allocated on an object. Note that Ko is the number of allocated indices (in an example of FIG. 3A, Ko=3).

Figure 3A:
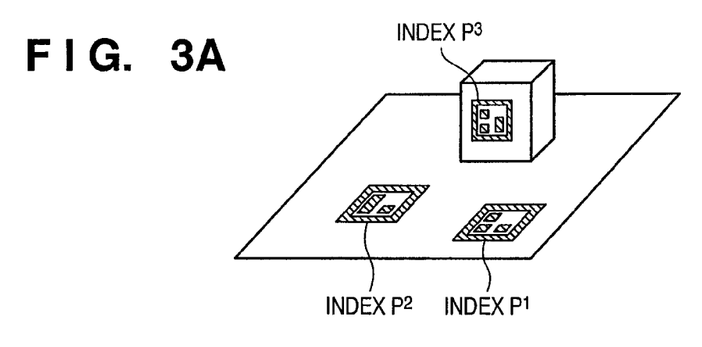
FIGS. 3A to 3C are views for explaining indices used in the first embodiment of the present invention.
Figure 3B:
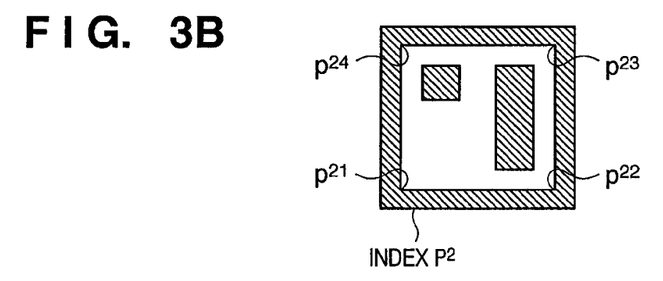
Figure 3C:
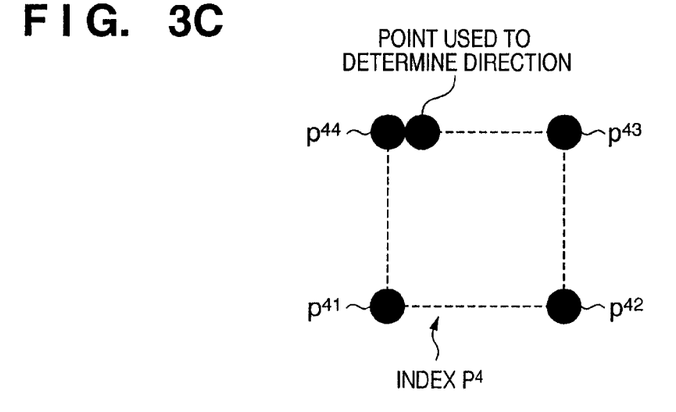

FIGS. 3A to 3C are views for explaining indices used in this embodiment. As shown in FIG. 3B, an index Pk is configured by vertices $p^{ki}$ (i=1, . . . , Nk). Note that Nk is the total number of vertices that configure the index Pk (in this embodiment, Nk=4).

In the following description, a coordinate system which serves as a reference for measurement (in this embodiment, a coordinate system which defines one point on the 3D physical space as an origin, and three orthogonal axes as X-, Y-, and Z-axes, respectively) will be referred to as a world coordinate system. Also, assume that the position and orientation of each index on the world coordinate system are known. Furthermore, assume that the position, on the world coordinate system, of each vertex which configures each individual index on the 3D physical space is known.

The index Pk may have an arbitrary form as long as the frame coordinates of its projected image on a sensed image are detectable, and each individual index and the respective vertices that configure the index are identifiable. For example, a rectangular index shown in FIG. 3B includes a pattern which represents an identifier unique to itself, and is uniquely identifiable.

Upon detection of such index, the sensed image undergoes binarization processing, and then labeling processing to extract, as an index candidate, an object formed by four lines from regions each having a given area or more. Furthermore, whether or not a candidate region is an index region is determined by determining whether or not the candidate region includes a specific pattern. By reading out an internal pattern, the direction and identifier of the index are acquired.

The operations of the respective units which configure the position and orientation measurement apparatus 2000 and the image sensing device 2010 will be described below.

As described above, the image sensing device 2010 senses a moving image of the 3D physical space. Each sensed frame image (physical space image) is input to the position and orientation measurement apparatus 2000 via the image input unit 2020, and is transmitted to the index detection unit 2030.

The index detection unit 2030 detects the image coordinates of respective vertices $p^{ki}$ which configure each index Pk that appears in the image received from the image input unit 2020. Furthermore, the index detection unit 2030 identifies each individual detected index $P^{kn}$. The index detection unit 2030 then outputs identifiers kn of indices and the image coordinates $u^{Pkni}$ of respective vertices $p^{kni}$ as its detection results to the data management unit 2070 and index detection condition acquisition unit 2040.

Note that n (n=N) is an index for each detected index, and N is the total number of detected indices. Also, let $N_{Total}$ be the total number of building points (vertices) defined by N indices. For example, FIG. 1 illustrates a case in which rectangular indices ($P^1, P^2, P^3$) with identifiers=1, 2, and 3 are sensed. Therefore, N=3, and the index detection unit 2030 outputs identifiers k1=1, k2=2, and k3=3, and the corresponding image coordinates $u^{pk1i}$, $u^{pk2i}$, and $u^{pk3i}$ (i=1, 2, 3, 4). $N_{total}$ is 12(=3×4).

The index detection condition acquisition unit 2040 stores and manages the detection result of indices on each frame input from the index detection unit 2030. The unit 2040 outputs a detection condition $V^{Pkn}$ of respective indices detected on the current frame (which is the latest frame, and will be referred to as the f-th frame hereinafter) to the reliability calculation unit 2050.

For example, the index detection condition acquisition unit 2040 outputs the number $a^{Pkn}$ of frames (the number of continuously detected frames) which are continuously detected from a past frame in association with each individual index detected in the f-th frame as the detection condition $V^{Pkn}$ of an index $P^{kn}$. In this embodiment, the upper limit is set for the number of continuously detected frames, and a predetermined number of frames or more (for example, which are 30 frames in case of one second, and will be referred to as h frames hereinafter) are not counted.

The reliability calculation unit 2050 calculates a reliability $\omega^{Pkn}$ of each index based on the detection condition $V^{Pkn}$ of that index calculated by the index detection condition acquisition unit 2040, and outputs the calculated reliability $\omega^{Pkn}$ to the data management unit 2070.

The reliability calculation in the reliability calculation unit 2050 will be described below. The reliability $\omega^{Pkn}$ of each index is calculated using a weighting function which uses the detection condition $V^{Pkn}$ as an argument, and is given by:

$$\omega^{Pkn} = \omega(V^{Pkn}) \quad (1)$$

The weighting function $\omega(V^{Pkn})$ is positive (>0). This function may be a weighting function used in M estimation as one of robust estimation techniques (a function that generates a stochastic model, and applies a larger weight to the model which fits observation data well), or may be a function obtained experimentally or empirically.

In this embodiment, the number $a^{Pkn}$ of continuously detected frames of each index is defined as the detection condition $V^{Pkn}$ of this index. A criterion "an index which is detected from a larger number of continuous frames is a more reliable index" is considered, and a weighting function which increases the reliability of an index which is detected from a larger number of continuous frames is defined. For example, the reliability $\omega^{Pkn}$ is calculated based on the number $a^{Pkn}$ of continuously detected frames of each index, and the number $a_{max}^{Pkn}$ of continuously detected frames of an index detected from the largest number of frames of all the indices by:

$$\omega(V^{Pkn}) = \frac{a^{Pkn}}{a_{max}^{Pkn}} \quad (2)$$

Or the reliability $\omega^{Pkn}$ may be calculated by:

$$\omega(V^{Pkn}) = \frac{a^{Pkn}}{h} \quad (3)$$

Also, functions other than the aforementioned functions may be used as long as they can give a reliability that reflects the number of continuously detected frames of each index.

The image sensing device initial position and orientation input unit 2060 calculates initial values $M_{WC}$ of the image sensing device 2010 on the world coordinate system, and outputs the calculated initial values $M_{WC}$ to the data management unit 2070. In this embodiment, the unit 2060 inputs the reliabilities of the detected indices, the image coordinates of respective vertices, and the positions of the vertices on the world coordinate system from the data management unit 2070, and calculates the position and orientation of the image sensing device 2010 using only information of the indices whose reliabilities are equal to or higher than a threshold.

A method of calculating the position and orientation of an image sensing device based on the correspondence between the image coordinates of a plurality of points and their positions on the world coordinate system (generally called a PnP problem) is known in the fields of photographic measurement and computer vision, and a detailed description thereof will not be given.

Note that the initial position and orientation acquisition method is not limited to such specific method. For example, the position and orientation calculated by the position and orientation calculation unit 2080 in the process one frame before may be held, and may be output as the initial position and orientation. Also, a six-degrees-of-freedom position and orientation sensor may be attached to the image sensing device, and an approximate position and orientation obtained as the output values of that sensor may be used as the initial position and orientation. Alternatively, a three-degrees-of-freedom position and orientation sensor may be attached to the image sensing device to measure the orientation of the image sensing device, and the initial position and orientation may be calculated using that orientation and indices whose reliabilities are equal to or higher than a threshold. Furthermore, the approximate position and orientation of the image sensing device may be calculated as the initial position and orientation using any other state-of-the-art techniques.

Let t be a 3D vector which represents a position of 3D coordinate system A with respective to certain 3D coordinate system B, and R be a 3×3 rotation matrix that represents an orientation. In this case, using a 4×4 matrix $M_{BA}$ given by:

$$M_{BA} = \begin{bmatrix} R & t \\ 0 & 1 \end{bmatrix} \quad (4)$$

coordinates $x_B$ (3D vector), on B, of a point whose position on A is expressed by $x_A$ (3D vector), is expressed by homogeneous coordinate expression described by:

$$\begin{bmatrix} x_B \\ 1 \end{bmatrix} = M_{BA} \begin{bmatrix} x_A \\ 1 \end{bmatrix} \quad (5)$$

In this embodiment, $M_{BA}$ is used as means for expressing the position and orientation of coordinate system A with respect to coordinate system B.

The data management unit 2070 holds the $p^{kn}$ positions and orientations $M_{WM}$ of respective indices on the world coordinate system and the positions (world coordinates) of respective vertices on the world coordinate system as known information calculated in advance. The unit 2070 inputs the identifiers kn of the respective indices $P^{kn}$ and the image coordinates $u^{Pkni}$ of respective vertices $p^{kni}$ detected by the index detection unit 2030 from the index detection unit 2030, and inputs the reliabilities of the respective indices from the reliability calculation unit 2050. Also, the unit 2070 inputs the initial values $M_{WC}$ of the position and orientation of the image sensing device 2010 on the world coordinate system, which are calculated by the image sensing device initial position and orientation input unit 2060. The unit 2070 holds these input data, and outputs them as needed.

The position and orientation calculation unit 2080 acquires the initial position and orientation of the image sensing device 2010 in a given frame, the identifiers and reliabilities of respective indices and detected from that frame, and the image coordinates and world coordinates of vertices from the data management unit 2070. The unit 2080 executes position and orientation calculation processing of the image sensing device 2010 using these acquired data, and outputs the position and orientation information of the image sensing device 2010 obtained as the calculation result (i.e., the position and orientation of the image sensing device 2010 on the world coordinate system).

Figure 2:
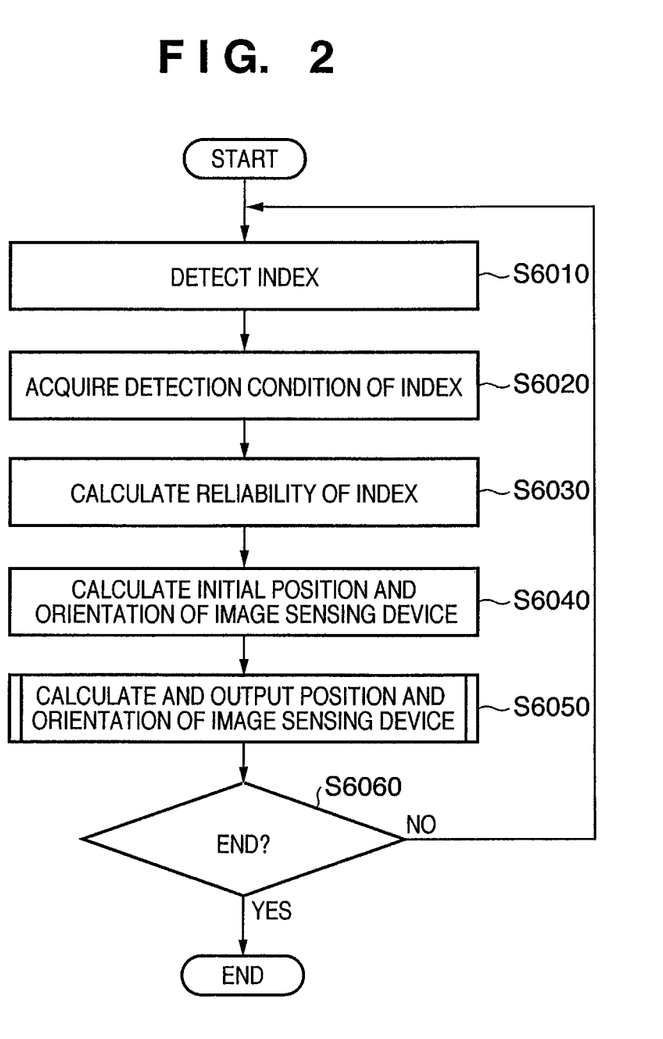
FIG. 2 is a flowchart of the position and orientation calculation processing of an image sensing device 2010 executed by the position and orientation measurement apparatus 2000.

FIG. 2 is a flowchart showing the position and orientation calculation processing of the image sensing device 2010 executed by the position and orientation measurement apparatus 2000.

In step S6010, the index detection unit 2030 executes the detection processing of indices from the latest image (f-th frame) input from the image sensing device 2010 via the image input unit 2020. The unit 2030 outputs the detection results (the identifiers kn of the detected indices and the image coordinate group $u^{Pkni}$ of the vertices) to the data management unit 2070 and index detection condition acquisition unit 2040. The index detection unit 2030 executes this detection processing to each of time-serially input images.

In step S6020, the index detection condition acquisition unit 2040 inputs the detection results from the index detection unit 2030, calculates the detection condition of each detected index from frames before the f-th frame, and outputs the calculated detection condition to the reliability calculation unit 2050. The detection condition calculation can be implemented by preparing a counter for each index, and executing the processing for incrementing the counter (within the range below the upper limit h) if that index is detected in the current frame, and resetting the counter to zero if it is not detected.

In step S6030, the reliability calculation unit 2050 inputs the detection conditions of the respective detected indices from the index detection condition acquisition unit 2040, and calculates the reliabilities of the respective indices using the weighting function. The unit 2050 outputs the reliabilities calculated for the respective indices to the data management unit 2070.

In step S6040, the image sensing device initial position and orientation input unit 2060 calculates the initial position and orientation $M_{WC}$ of the image sensing device 2010 on the world coordinate system in the f-th frame. The unit 2060 outputs the calculated initial position and orientation $M_{WC}$ to the data management unit 2070.

In step S6050, the position and orientation calculation unit 2080 acquires, from the data management unit 2070, the initial position and orientation of the image sensing device 2010 in the f-th frame, the identifiers and reliabilities of the respective indices detected in that frame, and the image coordinates and world coordinates of respective vertices. The unit 2080 executes the position and orientation calculation processing of the image sensing device 2010 using these acquired data, and outputs the position and orientation information of the image sensing device 2010 obtained as the calculation result. Details of the process in this step will be described later with reference to FIG. 4.

Finally, it is checked in step S6060 if the position and orientation calculation processing is to end. If the operator instructs the position and orientation measurement apparatus 2000 to end the position and orientation calculation processing, the processing ends. On the other hand, if the operator instructs to continue the position and orientation calculation processing, the process returns to step S6010 again to execute the processing for an image of the next frame ((f+1)-th frame).

Figure 4:
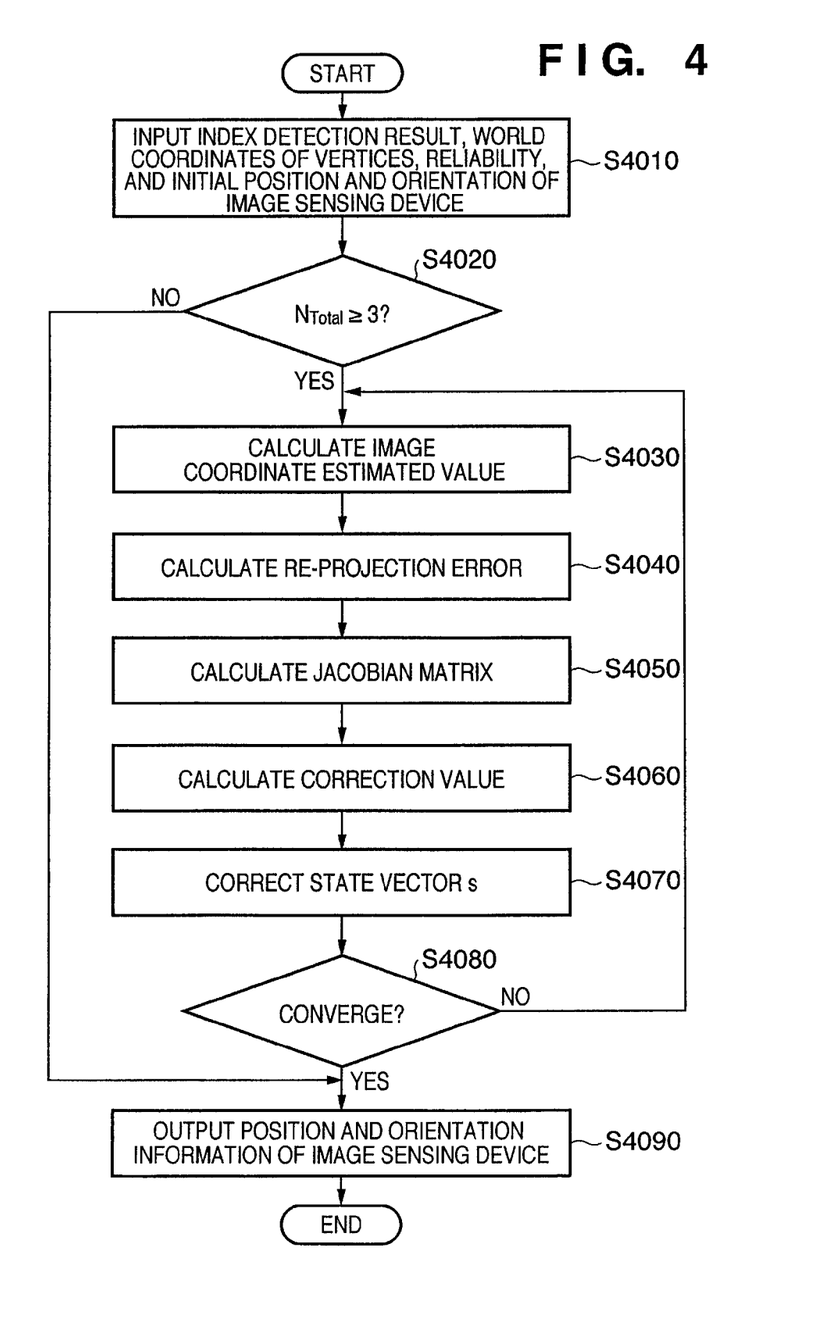
FIG. 4 is a flowchart showing details of the process in step S6050.

FIG. 4 is a flowchart showing details of the process in step S6050.

In step S4010, the position and orientation calculation unit 2080 acquires the initial position and orientation of the image sensing device 2010 in the f-th frame and the identifiers and reliabilities of indices detected in that frame, and the image coordinates and world coordinates of the vertices from the data management unit 2070.

The position and orientation calculation unit 2080 checks in step S4020 if the input information of the indices includes enough information to estimate the position and orientation, and branches the processes according to the checking result. More specifically, if the total number $N_{Total}$ of the vertices of the input indices is 3 or more, the process advances to step S4030; if it is less than 3, the process jumps to step S4090. For example, if one index configured by four vertices of a rectangle is detected, $N_{Total}$ is 4; if two indices each configured by three vertices of a triangle are detected, $N_{Total}$ is 6.

The position and orientation calculation unit 2080 handles the position and orientation of the image sensing device 2010 on the world coordinate system (or an arbitrary coordinate system) as unknown parameters to be calculated. In this embodiment, a three-valued vector $\alpha = [\xi \psi \zeta]^T$ is used as an orientation expression method. $\alpha$ is the orientation expression method based on the rotation axis and rotation angle, and the rotation matrix R is described as a function of $\alpha$ given by:

$$R(\alpha) = \begin{bmatrix} R_{11} & R_{12} & R_{13} \\ R_{21} & R_{22} & R_{23} \\ R_{31} & R_{32} & R_{33} \end{bmatrix}$$

$$= \begin{bmatrix} r_x^2(1-\cos r_\alpha) + \cos r_\alpha & r_x r_y(1-\cos r_\alpha) - r_z \sin r_\alpha & r_z r_x(1-\cos r_\alpha) + r_y \sin r_\alpha \\ r_x r_y(1-\cos r_\alpha) + r_z \sin r_\alpha & r_y^2(1-\cos r_\alpha) + \cos r_\alpha & r_y r_z(1-\cos r_\alpha) - r_x \sin r_\alpha \\ r_z r_x(1-\cos r_\alpha) - r_y \sin r_\alpha & r_y r_z(1-\cos r_\alpha) + r_x \sin r_\alpha & r_z^2(1-\cos r_\alpha) + \cos r_\alpha \end{bmatrix}$$

$$r_\alpha = \sqrt{\xi^2 + \psi^2 + \zeta^2}$$

$$r_x = \frac{\xi}{r_\alpha}, \ r_y = \frac{\psi}{r_\alpha}, \ r_z = \frac{\zeta}{r_\alpha}$$

(6)

At this time, the position and orientation to be calculated of the image sensing device 2010 are respectively expressed by a position $t=[x\ y\ z]^T$ and orientation $\alpha=[\xi\ \psi\ \zeta]^T$. Then, unknown parameters to be calculated are described as a six-valued state vector $s=[x\ y\ z\ \xi\ \psi\ \zeta]^T$.

In step S4030, the position and orientation calculation unit 2080 calculates an estimated value (re-projected coordinates) $u^{Pkni'}$ of the image coordinates of each vertex $p^{kni}$ of each individual index. The estimated value $u^{Pkni'}$ is calculated based on a function (observation equation) of the world coordinates $x_w^{Pkni}$ of each vertex $p^{kni}$ of the index, and the current state vector s, which is given by:

$$u^{Pkni'} = F_C(x_w^{Pkni}, s) \quad (7)$$

More specifically, the function $F_C()$ is configured by:

$$x_C^{Pkni} = [x_C^{Pkni}\ y_C^{Pkni}\ z_C^{Pkni}\ 1]^T = R(\alpha)\cdot x_w^{Pkni} + t \quad (8)$$

which is used to calculate a position vector $x_C^{Pkni}$ on a camera coordinate system from $x_w^{Pkni}$, and $$u^{Pkni'} = [u_x^{Pkni'}\ u_y^{Pkni'}]^T = \left[-f_x^B \frac{x_C^{Pkni}}{z_C^{Pkni}}\ -f_y^B \frac{y_C^{Pkni}}{z_C^{Pkni}}\right]^T \quad (9)$$

which is used to calculate coordinates $u^{Pkni'}$ on the image from the $x_C^{Pkni}$. In formula (9), $f_x^B$ and $f_y^B$ are respectively the focal lengths of the image sensing device 2010 in the x- and y-axis directions, and are held in advance in the data management unit 2070 as known values.

In step S4040, the position and orientation calculation unit 2080 calculates an error (re-projection error) $\Delta u^{Pkni}$ between the actually measured value $u^{Pkni}$ of each vertex $p^{kni}$ of each index, and the calculated value $u^{Pkni'}$ of the corresponding image coordinates by:

$$\Delta u^{Pkni} = u^{Pkni} - u^{Pkni'} \quad (10)$$

In step S4050, the position and orientation calculation unit 2080 calculates an image Jacobian $J_{us}^{Pkni}(=\partial u^{Pkni}/\partial s)$ associated with the state vector s for each vertex $p^{kni}$ of each index. Note that this image Jacobian is a Jacobian matrix of 2 rows×6 columns which has, as elements, solutions obtained by partially differentiating the function $F_C()$ given by formula (7) by the respective elements of the state vector s.

More specifically, the position and orientation calculation unit 2080 calculates a Jacobian matrix $J_{ux}^{Pkni}(=\partial u^{Pkni}/\partial x)$ of 2 rows×3 columns, which has, as elements, solutions obtained by partially differentiating the right-hand side of formula (9) by respective elements of the camera coordinates $x_C^{Pkni}$, and a Jacobian matrix $J_{xs}^{Pkni}(=\partial x/\partial s)$ of 3 rows×6 columns, which has, as elements, solutions obtained by partially differentiating the right-hand side of formula (8) by respective elements of the vector s. Then, the unit 2080 calculates $J_{us}^{Pkni}$ by:

$$J_{us}^{Pkni} = J_{ux}^{Pkni} \cdot J_{xs}^{Pkni} \quad (11)$$

In step S4060, the position and orientation calculation unit 2080 calculates a correction value $\Delta s$ of the state vector s based on the errors $\Delta u^{Pkni}$ and image Jacobians $J_{us}^{Pkni}$ of the vertices of the respective indices, and the reliabilities $\omega^{Pkn}$ of the respective indices. Details of the calculation processing of the correction value $\Delta s$ will be described below.

Initially, the position and orientation calculation unit 2080 generates a $(2N_{Total})$-dimensional error vector U defined by vertically arranging the re-projection errors at the vertices of the respective indices:

$$U = \begin{bmatrix} \Delta u^{Pk11} \\ \Delta u^{Pk12} \\ \vdots \\ \Delta u^{PkN3} \\ \Delta u^{PkN4} \end{bmatrix} \quad (12)$$

The position and orientation calculation unit 2080 generates a matrix $\Phi$ of $(2N_{Total})$ rows×6 columns defined by vertically arranging the Jacobian matrices $J_{us}^{Pkni}$ at the vertices of the respective indices:

$$\Phi = \begin{bmatrix} J^{Pk11} \\ J^{Pk12} \\ \vdots \\ J^{PkN3} \\ J^{PkN4} \end{bmatrix} \quad (13)$$

The position and orientation calculation unit 2080 then generates a diagonal matrix W of $(2N_{Total})$ rows×$(2N_{Total})$ columns, which has, as diagonal components, the reliabilities $\omega^{Pkn}$ of the indices $p^{kn}$ for elements (having two elements of x- and y-coordinates for each vertex) corresponding to the respective vertices $p^{kni}$ of the indices $p^{kn}$:

$$W = \begin{bmatrix} \omega^{Pk1} & 0 & \cdots & \cdots & \cdots & 0 \\ 0 & \omega^{Pk1} & & & & \vdots \\ \vdots & & \ddots & 0 & & \vdots \\ \vdots & & & \ddots & & \vdots \\ \vdots & & 0 & & \ddots & \vdots \\ \vdots & & & & \omega^{PkN} & 0 \\ 0 & \cdots & \cdots & \cdots & 0 & \omega^{PkN} \end{bmatrix} \quad (14)$$

In consideration of the calculation of $\Delta s$ by the method of least squares using the matrix W as the weights, the following normalization equation:

$$(\Phi^T W \Phi)\Delta s = \Phi^T W U \quad (15)$$

is obtained. Then, the position and orientation calculation unit 2080 calculates $\Delta s$ by:

$$\Delta s = (\Phi^T W \Phi)^{-1} \Phi^T W U \quad (16)$$

In this manner, using, as the weights, the matrix W that represents the continuity of detection of indices as the reliabilities in the calculation of $\Delta s$, the effect in which the degrees of contribution of the respective indices to the calculation of $\Delta s$ change depending on the continuity of detection can be obtained. That is, indices which are continuously detected from past frames (which are more likely to be reliable) are positively used in the calculation of $\Delta s$, thus obtaining the effect of reducing the adverse influence from indices with poor continuity (which are more likely to be erroneously detected indices).

Note that the weights according to the re-projection errors $\Delta u^{Pkni}$ of the indices may be calculated by the statistical estimation technique such as M estimation, to obtain the products of $\omega^{Pkn}$ and these weights, and the projects may be used as weights.

Note that Δs is a six-dimensional vector, and if $2M_{Total}$ is 6 or more, Δs can be calculated. In this embodiment, Δs is calculated like in formula (16), but other methods may be used. For example, since formula (15) is given by linear simultaneous equations, Δs may be solved by Gaussian elimination or by any other techniques.

In step S4070, the position and orientation calculation unit 2080 corrects s using the correction value Δs calculated in step S4060 according to formula (17) below, and sets the corrected value as new s:

$$s+\Delta s \rightarrow s \tag{17}$$

Note that the position and orientation calculation unit 2080 uses, as the initial values of the state vector s, the "initial values $M_{WC}$ of the position and orientation of the image sensing device 2010 on the world coordinate system" calculated by the image sensing device initial position and orientation input unit 2060.

The position and orientation calculation unit 2080 checks in step S4080 if the calculations have converged, using some criteria as to whether or not the error vector U is smaller than a predetermined threshold or whether or not the correction value Δs is smaller than a predetermined threshold. If the calculations have not converged, the unit 2080 executes the processes in step S4030 and subsequent steps again using s after correction.

If it is determined in step S4080 that the calculations are converged, the position and orientation calculation unit 2080 outputs the position and orientation s of the image sensing device 2010 on the world coordinate system in step S4090. As the output form at this time, s itself may be output, information that expresses the position components of s by a three-valued vector, and the orientation components by an Euler angle or a 3×3 rotation matrix may be output, or a coordinate transformation matrix M generated from s may be output.

With the aforementioned processing, the position and orientation or the position alone of the image sensing device 2010 with respect to the world coordinate system (i.e., on the world coordinate system) can be acquired.

According to this embodiment, since the position and orientation estimation is made in consideration of the continuity of detection of the indices, the influence of the erroneously detected indices (which are often not detected as identical indices among continuous frames) is reduced, and the position and orientation of the image sensing device 2010 can be stably measured.

Modification 1

In the above description, the reliability $\omega^{Pkn}$ is calculated to give a higher reliability to an index which is continuously detected in many frames from the past to current frames. However, if the reliability is calculated according to the detection condition $V^{Pkn}$ of the index in a plurality of frames, the type of detection information is not limited to this, and other reliability calculation methods may be used.

For example, the number $b^{Pkn}$ of times of detection of an index in h past frames from the current frame may be used as a detection condition $V^{Pkn}_{freq}$, and the reliability $\omega^{Pkn}$ may be calculated based on that detection condition. In this case, a function $\omega_{freq}(V^{Pkn}_{freq})$ which gives a high reliability to an index with a large number of times of detection and a low reliability to an index with a small number of times detection is defined as the weighting function. For example, based on the number $b^{Pkn}$ of times of detection of each index and the maximum number $b_{max}^{Pkn}$ of times of detection of the index which is detected most frequently of the detected indices, the reliability may be calculated as:

$$\omega_{freq}(V^{Pkn}_{freq}) = \frac{b^{Pkn}}{b^{Pkn}_{max}} \tag{18}$$

Or the reliability may be calculated as:

$$\omega_{freq}(V^{Pkn}_{freq}) = \frac{b^{Pkn}}{h} \tag{19}$$

The reliability may be calculated by calculation methods other than that described above as long as it is based on the number of times of detection of an index. In place of merely using the reliability, which is calculated in this way based on the number of times of detection of an index in h past frames, as the reliability $\omega^{Pkn}$, a reliability calculated by another method may be combined with the aforementioned reliability by calculating their product or average, and that reliability may be used.

Modification 2

In modification 1, the reliability is calculated based on the number $b^{Pkn}$ of times of detection in h past frames. However, as long as the reliability is calculated according to the detection condition $V^{Pkn}$ in a plurality of frames, the number $b^{Pkn}$ of times of detection may be calculated based on both the continuity and the number of times of detection in h past frames and then the reliability may be calculated.

For example, a total number of times of detection of an index which was continuously detected a predetermined number of times or more from the current frame until a given past frame is calculated as the number $b^{Pkn}$ of times of detection. The calculated number $b^{Pkn}$ of times of detection may be used as the detection condition $V^{Pkn}$, and the reliability $\omega^{Pkn}$ may be calculated based on this detection condition. In this case, a function $\omega_{sum}(V_{sum}^{Pkn})$ which gives a high reliability to an index having a larger total number of times of detection of the index, which was continuously detected a predetermined number of times or more, and gives a low reliability to an index having a smaller total number of times of detection of the index, which was continuously detected a predetermined number of times or more is defined as the weighting function. For example, based on the number $b^{Pkn}$ of times of detection of each index, and the maximum number $b_{max}^{Pkn}$ of times of detection of the index which is detected most frequently of the detected indices, the reliability may be calculated as:

$$\omega_{sum}(V^{Pkn}_{sum}) = \frac{b^{Pkn}}{b^{Pkn}_{max}} \tag{20}$$

Or the reliability may be calculated as:

$$\omega_{sum}(V^{Pkn}_{sum}) = \frac{b^{Pkn}}{h} \tag{21}$$

In place of merely using the reliability, which is calculated in this way based on the total of the numbers of times of detection of an index which was continuously detected a predetermined number of times or more from the current frame until a given past frame, as the reliability $\omega^{Pkn}$ a reliability calculated by another method may be combined with the aforementioned reliability by calculating their product or average, and that reliability may be used.

Modification 3

In the above description, an index having a plurality of vertices, as shown in FIG. 3B, is used. However, the same effect as in the first embodiment can be provided even when circular or spherical markers having different colors are used as indices or when feature points such as natural features having different texture features are used as indices. That is, an index may have an arbitrary form as long as the image coordinates of its projected image on a sensed image are detectable, and each individual index is identifiable.

When the circular or spherical markers or natural features are used, information of an index is expressed by a position $x_w^{Pkn}=[x_w, y_w, z_w]$ on the world coordinate system (reference coordinate system), and can be handled in the same manner as the vertices of each index in the first embodiment. Even when these indices (polygonal indices, circular indices, natural features, and the like) are used together, the same effect as in the first embodiment can be obtained.

Modification 4

In the above description, the Newton-Raphson method, which calculates a correction value by Taylor-expanding nonlinear equations and linearizing them by linear approximation in optimization arithmetic operations, and repetitively corrects solutions to obtain optimal solutions, is used. However, the correction value need not always be calculated by the Newton-Raphson method. For example, the correction value may be calculated using an LM method (Levenberg-Marquardt method) as a known iterative solution technique of nonlinear equations, or using a steepest descent method. That is, any other numeric calculation techniques may be applied.

Second Embodiment

The description of the first embodiment is given under the assumption that the respective units which form the position and orientation measurement apparatus 2000 are implemented by hardware. However, some or all of these units may be implemented by software, and the remaining units may be implemented by hardware such as, e.g., an image processing board or the like. In this case, this software is installed in a computer such as a normal PC or the like. Then, when a CPU of this computer executes the installed program, this computer implements the functions of the respective units which form the position and orientation measurement apparatus 2000.

Figure 5:
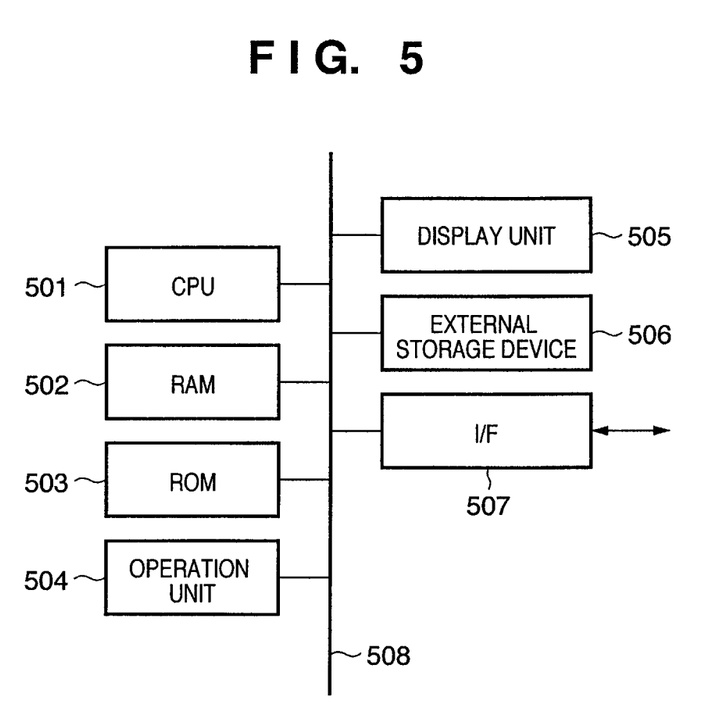
FIG. 5 is a block diagram showing the hardware arrangement of a computer.

FIG. 5 is a block diagram showing the hardware arrangement of such computer.

A CPU 501 controls the overall computer using programs and data stored in a RAM 502 and ROM 503. Furthermore, when this computer is applied to the position and orientation measurement apparatus 2000, the CPU 501 executes the respective processes which are described as those to be implemented by the position and orientation measurement apparatus 2000 (the processes according to the flowcharts shown in FIGS. 2 and 4).

The RAM 502 has an area for temporarily storing programs and data loaded from an external storage device 506, and frame images received from the image sensing device 2010 via an I/F (interface) 507. Furthermore, the RAM 502 has a work area used when the CPU 501 executes various kinds of processing. That is, the RAM 502 provides various areas as needed.

The ROM 503 stores setting data, a boot program, and the like of this computer.

An operation unit 504 comprises a keyboard, mouse, and the like. When the operator of the computer operates the operation unit 504, the operator can input various instructions to the CPU 501.

A display unit 505 comprises a CRT, liquid crystal display, or the like, and can display the processing results of the CPU 501 by using images, text, and the like.

The external storage device 506 is a large-capacity information storage device represented by a hard disk, and saves an OS (operating system), programs and data which make the CPU 501 execute the functions of the respective units (except for the data management unit 2070) which form the position and orientation measurement apparatus 2000, and the like. The external storage device 506 also saves pieces of information, which are managed by the data management unit 2070, and known information in the above description. The programs and data saved in the external storage device 506 are loaded onto the RAM 502 as needed under the control of the CPU 501, and are to be processed by the CPU 501.

The I/F 507 is used to connect the computer to the image sensing device 2010. Respective frame images sensed by the image sensing device 2010 are output to the external storage device 506 and RAM 502 via this I/F 507.

A bus 508 interconnects the aforementioned units.

Other Embodiments

The objects of the present invention are also achieved as follows. That is, a recording medium (or storage medium), which records a program code of software that can implement the functions of the aforementioned embodiments, is supplied to a system or apparatus. A computer (or a CPU or MPU) of the system or apparatus reads out and executes the program code stored in the recording medium. In this case, the program code itself read out from the recording medium implements the functions of the aforementioned embodiments, and the recording medium which stores the program code constitutes the present invention.

When the computer executes the readout program code, an operating system (OS) or the like, which runs on the computer, executes some or all of actual processes based on instructions of the program code. The present invention includes a case wherein the functions of the aforementioned embodiments are implemented by these processes.

Furthermore, assume that the program code read out from the recording medium is written in a memory equipped on a function expansion card or a function expansion unit, which is inserted in or connected to the computer. The present invention also includes a case wherein the functions of the aforementioned embodiments are implemented when a CPU or the like arranged in the expansion card or unit then executes some or all of actual processes based on instructions of the program code.

When the present invention is applied to the recording medium, that recording medium stores program codes corresponding to the aforementioned flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-320872 filed Nov. 28, 2006 which is hereby incorporated by reference herein in its entirety.

What is claimed is:

1. A position and orientation measurement method, comprising:
    an input step of inputting sensed images of a plurality of frames time-serially sensed by an image sensing device;
    a detection step of detecting indices allocated in a physical space from each of the sensed images;
    an acquisition step of acquiring, with respect to each of the indices detected in the sensed image of a frame of interest, a detection state of an identical index from frames before the frame of interest; and
    an estimation step of estimating a position and orientation of the image sensing device using at least information associated with image coordinates of the respective indices detected from the frame of interest in the detection step and the detection state of the identical index from the frames before the frame of interest acquired in the acquisition step.

2. The method according to claim 1, wherein, in the acquisition step, as the detection state, continuity of detection of the identical index in the sensed images of the respective frames before the frame of interest is acquired.

3. The method according to claim 1, wherein in the acquisition step, as the detection state, the number of times of detection of the identical index in the sensed images of the respective frames before the frame of interest is acquired.

4. The method according to claim 1, wherein in the acquisition step, as the detection state, the number of times of continuous detection of the identical index in the sensed images of the respective frames before the frame of interest is acquired.

5. The method according to claim 1, further comprising a weighting step of weighting the indices detected in the sensed image of the frame of interest according to the detection states of the respective indices acquired in the acquisition step; and
    wherein, in the estimation step, the position and orientation of the image sensing device is estimated using the information associated with image coordinates of the respective indices in the frame of interest weighted in the weighting step.

6. A non-transitory computer-readable storage medium storing a computer program for making a computer execute a position and orientation measurement method according to claim 1.

7. The method according to claim 1, further comprising an obtaining step of obtaining an initial position and orientation of the image sensing device; and wherein, in the estimation step, a current position and orientation of the image sensing device is estimated using the initial position and orientation of the image sensing device.

8. A position and orientation measurement apparatus, comprising:
    an input unit configured to input sensed images of a plurality of frames time-serially sensed by an image sensing device;
    a detection unit adapted to detect indices allocated in a physical space from each of the sensed images;
    an acquisition unit configured to acquire, with respect to each of the indices detected in the sensed image of a frame of interest, a detection state of an identical index from frames before the frame of interest;
    an estimation unit configured to estimate a position and orientation of the image sensing device using at least information associated with image coordinates of the respective indices detected from the frame of interest by the detection unit and the detection state of the identical index from the frames before the frame of interest acquired by the acquisition unit.

* * * * *